Aug. 4, 1964 R. J. McCRORY ETAL 3,143,282
FREE-PISTON ENGINE COMPRESSOR
Filed June 18, 1962 4 Sheets-Sheet 2
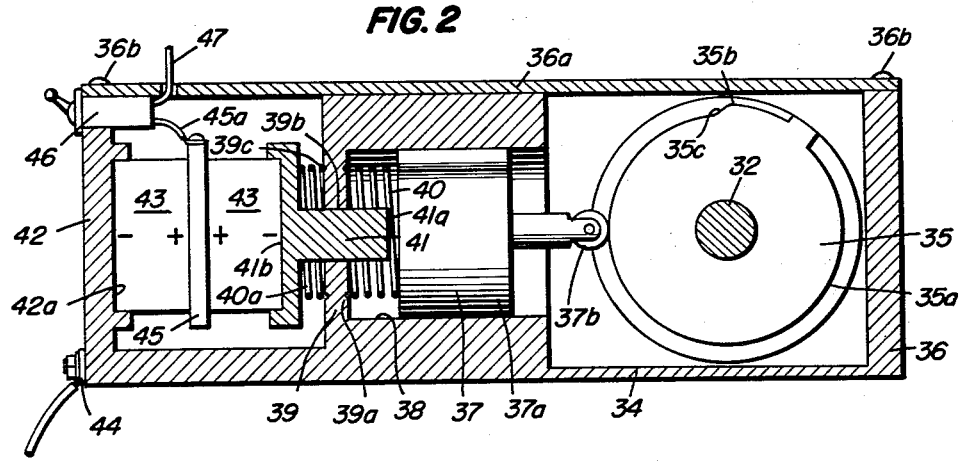
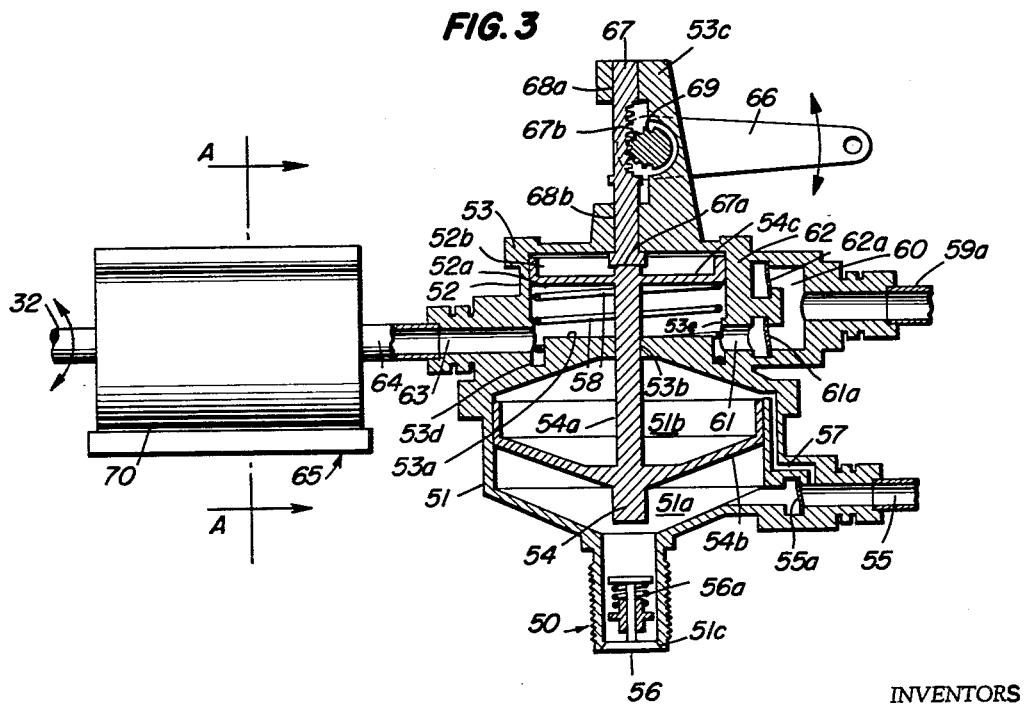
INVENTORS
ROLLIN J. McCRORY
FREDERICK A. CRESWICK
ROBERT W. KING
BY
ATTORNEY Aug. 4, 1964  R. J. McCRORY ETAL  3,143,282
FREE-PISTON ENGINE COMPRESSOR
Filed June 18, 1962  4 Sheets-Sheet 3

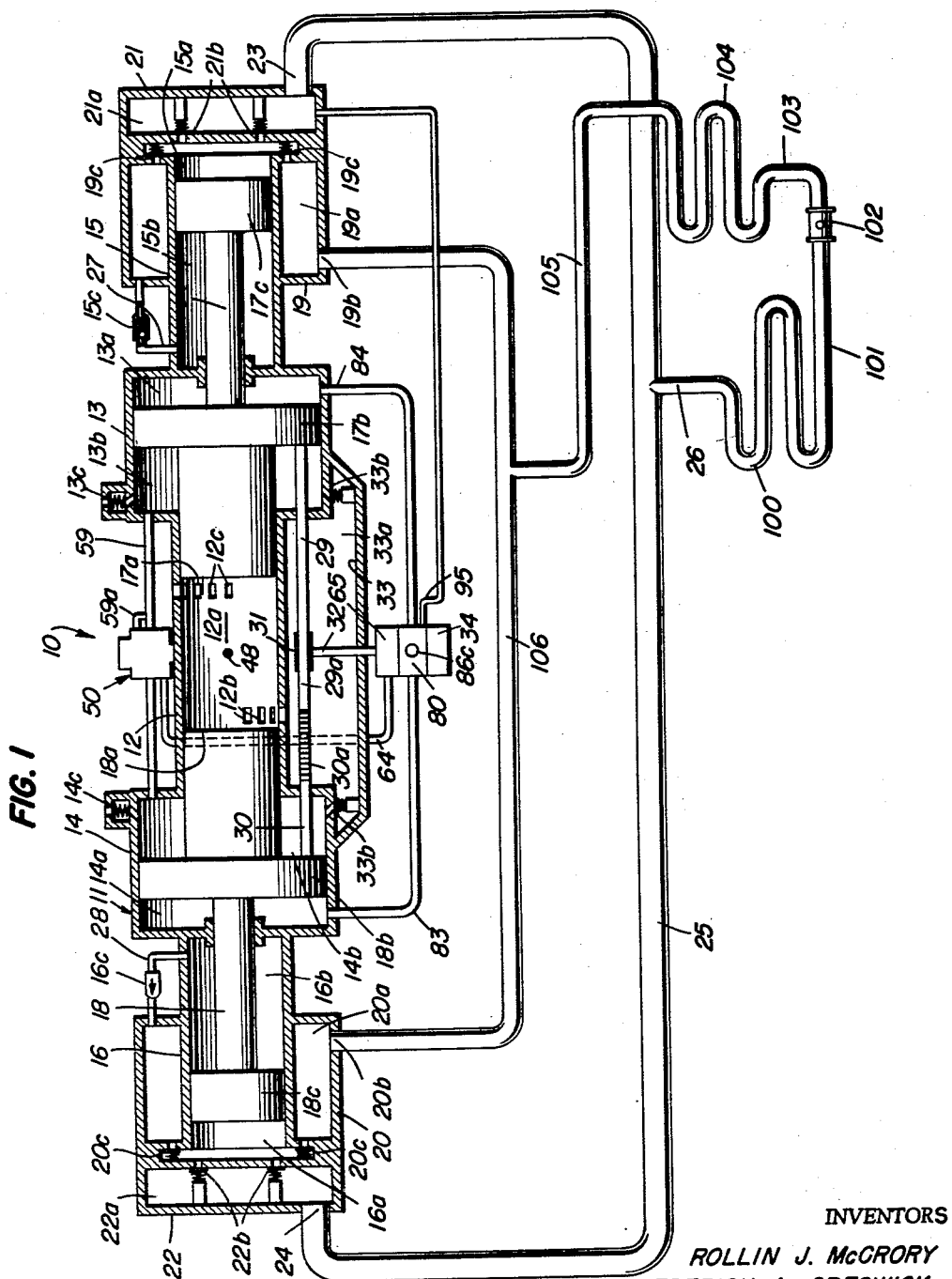

INVENTORS
ROLLIN J. McCRORY
FREDERICK A. CRESWICK
ROBERT W. KING
BY
ATTORNEY

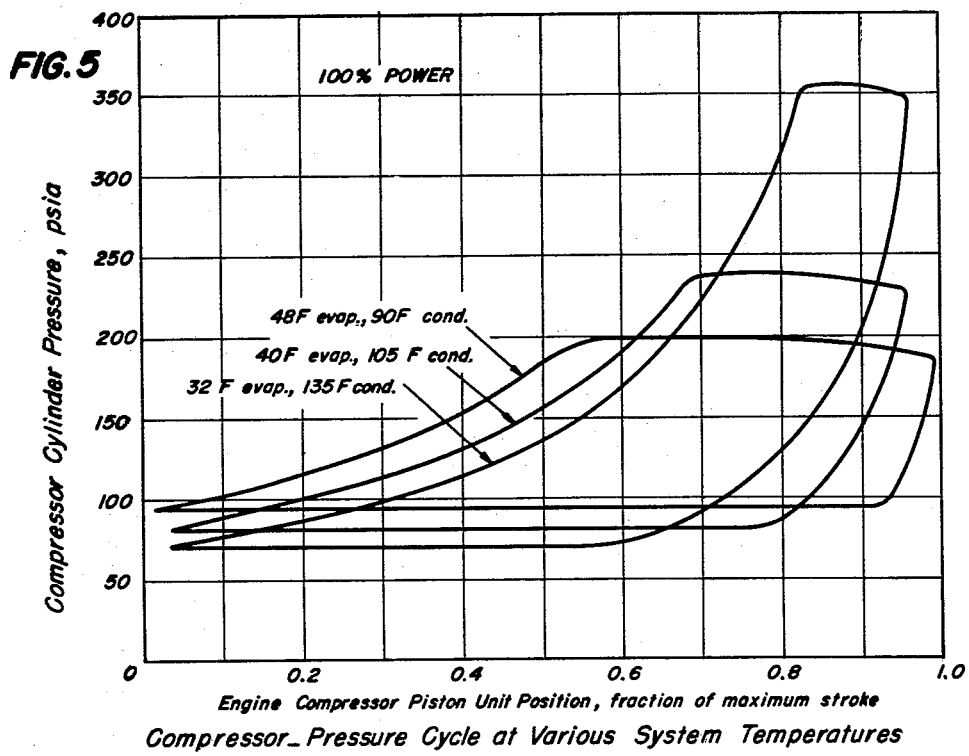
Compressor-Pressure Cycle at Various System Temperatures
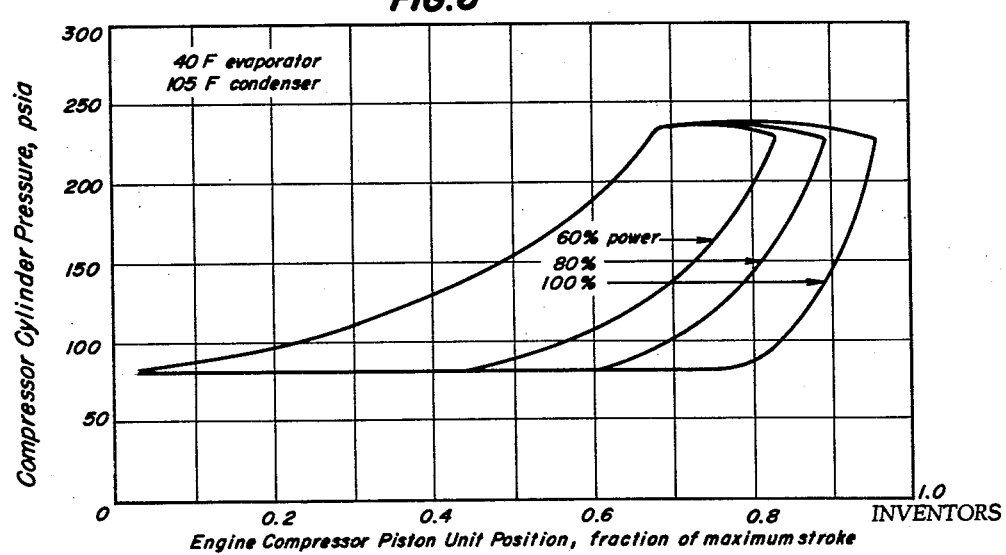
Compressor-Pressure Cycle at Various Engine Power Levels

3,143,282
FREE-PISTON ENGINE COMPRESSOR

Rollin J. McCrory, Frederick A. Creswick, and Robert W. King, Columbus, Ohio, assignors, by mesne assignments, to The Battelle Development Corporation, Columbus, Ohio, a corporation of Delaware
Filed June 18, 1962, Ser. No. 203,344
15 Claims. (Cl. 230—56)

This invention relates to free-piston internal combustion engine compressors and is more particularly concerned with free-piston engine compressors in which the piston means utilizes power of internal combustion within a power cylinder to effect intake and output of a gaseous fluid relative to a compressor cylinder in which the piston means also acts.

Basically, free-piston internal combustion engine compressors are single or plural piston compressors in which the piston or pistons undergo reciprocation to exert a fluid compressing function and each power stroke derives energy from a corresponding charge of fuel ignited and burned in a combustion chamber wherein the force of expansion of the burning fuel is transmitted to the piston means. The return stroke, which brings the piston means back to beginning another power stroke, occurs as a bounce prompted by action of bounce energy which is stored from the preceding power stroke and introduced for the return stroke. The motion of the piston or pistons thus is not mechanically restrained in the well-known sense of crank-type engines having connecting rods associated with the piston means and a crank shaft; instead, the piston means reciprocates between inner and outer dead positions where, respectively, travel of the piston means reverses while being restricted beyond these positions by fluid pressure.

A free-piston, two-stroke-cycle internal combustion engine compressor to serve as a mover for gas or vapor is potentially attractive as compared with a crank shaft internal combustion engine driven compressor, and yet toward providing a commercially practical free-piston engine compressor for this purpose it becomes highly important to overcome problems thereafter to assure that the engine compressor will accommodate satisfactorily a reasonably wide range of tolerable work loads. The wider performance capabilities accordingly are attractive for the engine compressor to fulfill many existing market demands and serve uses which otherwise in character or extent would be precluded. In free-piston engine compressors, however, there comes the problem that changes in work load introduced to the piston means tend to throw the engine compressor so out of balance that operation is impossible, stalling occurs or operation otherwise is impaired. Load variations may of course be encountered from one installation to another because of inherent differences in load which are initially represented or where the engine compressor is called upon to operate under varying load which is characteristic of a particular installation. Thus, for example, a free-piston engine compressor operated to move and compress a gaseous heat exchange medium in an air conditioning system, in a heat pump system or in a refrigeration system, to sustain any of a number of temperatures at an evaporator, or at a condenser, accordingly experiences differences in work load. This may be due initially to characteristics of the particular system and then to operation of the system to meet varying heat exchange demands.

As further illustrative of certain problems, a free-piston engine compressor in the prior art which is committed to constant stroke length of operation produces a constant volumetric displacement per cycle of the compressor. Changes in load are compensated to sustain this constant stroke length by varying the combustion power input per cycle of the engine. Thus, there is no opportunity at all for such an engine compressor to receive substantially constant combustion power input per cycle while functioning under varying load on output, for in order to maintain stability of operation of the engine compressor under varying load the combustion power input essentially is varied.

An object of the present invention therefore is the provision of a free-piston engine internal combustion engine compressor which operates stably on substantially constant combustion power input from cycle to cycle, and from a substantially constant inner dead position of the piston means, despite discharge of the compressor being at any of a variety of pressures.

Another object of this invention is the provision of a variable stroke two-stroke-cycle free-piston internal combustion engine compressor which is automatically compensated so as to retain stability of operation under conditions where the compressor work load may vary considerably from cycle to cycle of the engine compressor operation, and which engine compressor may have its power input modulated thus to achieve any of a number of volumetric output capacities of the compressor.

Another object of the invention is that of providing an opposed free-piston internal combustion engine compressor in which a plurality of compressing chambers of the compressor means are so interrelated to each other and to power input that work load is substantially balanced thus diminishing machine vibration, and which engine compressor operates stably from cycle to cycle from a substantially constant inner dead position of the piston means despite the fact that any of a variety of work loads on output of the compressor means may be experienced.

Another object of this invention is the provision of a two-stroke-cycle free-piston internal combustion engine compressor in which the free-piston means has bounce pressure regulating means so responsive to the discharge pressure of the engine compressor that the average bounce pressure build-up per cycle of operation of the engine compressor piston-means varies inversely as the discharge pressure, and a substantially constant inner dead position of the internal combustion compressor piston means is maintained from cycle to cycle of operation.

Another object is the provision of a free-piston internal combustion engine compressor of the character indicated in which pressure of gas in a bounce chamber associated with the engine compressor piston means is adjusted with reference to substantially constant pressure and with reference to position of the piston means in stroke, for bounce pressure thereafter produced on the power stroke to stabilize operation of the engine compressor in view of the particular discharge pressure against which the compressor is working.

A further object of this invention is that of providing a free-piston internal combustion engine compressor of the character indicated in which pneumatic bounce fluid in a bounce chamber is compressed to bounce pressure after being equalized in pressure to a reference pressure lower than ultimate maximum bounce pressure during each cycle of the engine compressor, in which the mass of the bounce fluid at the reference pressure is varied inversely as a function of load experienced on discharge by the compressor, and in which the available mass at the reference pressure is compressed to bounce pressure by the engine compressor piston means, for bounce of the engine compressor piston means to occur against the bounce fluid and for stroke of the piston means to vary in length from a substantially constant inner dead position as a function of the compressor load.

Another object of this invention is the provision of a two-stroke-cycle internal combustion free-piston engine compressor having on substantially constant power input, variable stroke length of the piston means thereof from a substantially constant inner dead position in response to varying work load, and which engine compressor is well suited for such purposes as compressing and circulating heat exchange fluid in a compressor-condenser-expansion system as for example where the system is a refrigeration system, air conditioning system, or a system commonly identified as a heat pump.

Other objects will be obvious and in part will be pointed out more fully hereinafter.

In accordance with the present invention a two-stroke-cycle free-piston internal combustion engine compressor is provided in which power is transmitted from a combustion chamber to a compressing chamber by means of a reciprocative piston unit which has a piston face in the combustion chamber and a piston face in the compressing chamber. The reciprocative piston unit may for example include an engine piston and a compressor piston respectively in initially separate free-piston engine and compressor units which later have had their pistons interconnected to act in unison, and the reciprocative piston unit in other instances may be one which is formed and exists prior to being assembled in a single engine compressor body, to act in a combustion chamber and a compressing chamber within the body. The latter type of free-piston engine compressor usually is preferred for such reasons as avoiding problems having to do with alignment, spacing and mounting of a free-piston engine and a compressor initially as separate units.

It will be appreciated that in accordance with the invention the free-piston engine compressor may include one or more reciprocative piston units and, in the case of a plurality of piston units, the pistons illustratively are opposed, being in a combustion chamber and respectively different compressing chambers so as to move outward away from each other on the power stroke of the engine, and back toward each other on the return stroke to compress a further charge of fuel in the combustion chamber preparatory to the next power stroke. During the return stroke, the single or plural reciprocative piston units, as the case may be, produce volume increase in the related compressing chamber of the engine compressor and gaseous fluid is taken in through an inlet port of the corresponding chamber and is thereafter discharged through an outlet port during the ensuing power stroke with an accompanying reduction in volume in the compressing chamber. The discharge pressure of fluid through the outlet port of the compressing chamber introduces resistance to movement of the reciprocative piston unit or units during the power stroke in the sense that this discharge pressure exists as a function of work load.

One or more bounce chambers provided in the engine compressor combination are used in controlling stroke length and to store energy for reversing direction of the motion of the piston means. Moreover, a substantially constant inner dead position of the piston means of the engine compressor combination is importantly sustained from cycle to cycle, this by control means which regulates the bounce chamber energy to a value which is an inverse function of the engine compressor discharge pressure. Stroke length thus is affected by the engine compressor load; however, the alteration of length is evidenced primarily by change in the outer dead position of the piston means from cycle to cycle, which change occurs as occasion may demand, while the inner dead position remains substantially constant. Different discharge loads therefore are permissible within considerable limits, either or both whether the differing pressure on discharge is experienced by the engine compressor through choice having been exercised in installing and operating the engine compressor in any of a number of possible places each representing a different load demand, or where change in discharge load on the engine compressor simply arises in any given installation from one power stroke to another power stroke of the engine compressor. Even greater utility and higher performance capabilities accrue in those instances where the free-piston engine compressor includes means for modulating power input to the engine compressor and thus modulating capacity of the compressor through producing change of stroke of the piston means under a given pressure against which the engine compressor is working on discharge.

An outstanding object of the present invention accordingly is the provision of a two-stroke-cycle free-piston internal combustion engine compressor having fuel injection means in output communication with combustion chamber space of the engine compressor and having substantially the same quantity output of fuel to the combustion space for a series of cycles of the engine compressor operation, for the free-piston means to operate on substantially constant power input throughout those cycles of the engine compressor, and which engine compressor operates stably from cycle to cycle despite possible variations in work load being encountered on output by the compressor means of the engine compressor.

In the accompanying drawings serving to illustrate certain embodiments of the present invention:

FIGURE 1 is a schematic horizontal sectional plan view of an engine compressor unit, and further the figure schematically represents a related load hook-up sometimes employed;

FIGURE 2 is a detail view in sectional elevation of a spark ignition device of the internal combustion engine of the engine compressor;

Figure 4:
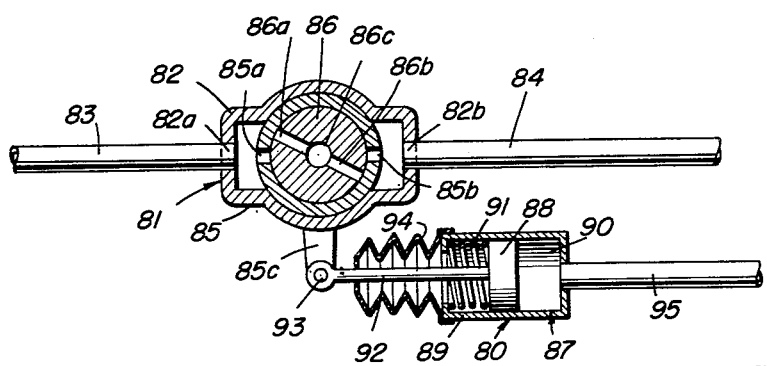

FIGURES 3A, 3B, 3C, and 3D are sectional elevations respectively taken through the control valve on line A—A in FIGURE 3 and representing different positions of this valve during the engine compressor operation;

FIGURE 4 represents in sectional elevation a bounce control valve for the engine compressor piston means;

FIGURE 5 is a diagram indicating behavior of the engine compressor piston means under substantially constant combustion power input from cycle to cycle and varying work load encountered by the compressor on output; and FIGURE 6 is a diagram representing behavior of the engine compressor piston means under constant work load from cycle to cycle of the engine compressor operation where modulation of the combustion power input to the engine compressor is embodied.

Referring now more particularly to the embodiment represented in FIGURE 1, a two-stroke-cycle free-piston engine compressor 10 is provided having casing means 11 within which, in substantially fixed positions and in axial alignment with respect to each other, are an internal combustion power cylinder 12, pneumatic cylinders 13 and 14, and gas compressor cylinders 15 and 16. A central barrel of casing means 11 in the present instance houses the engine section of the engine compressor and the compressor cylinders 15 and 16 extend outward from the opposite outer ends of the central barrel. The pneumatic cylinders 13 and 14 of the engine section are between the compressing cylinders and the combustion power cylinder respectively at opposite ends of the power cylinder. The several cylinders accommodate axially aligned reciprocative free-piston units 17 and 18 of the engine compressor 10. Thus, adjacent ends 17a and 18a of the free-piston units 17 and 18 are in opposed positions within the internal combustion power cylinder 12, there forming a combustion chamber 12a with the latter cylinder. From the combustion chamber the free-piston unit 17 extends outward lengthwise and has cylinder space partitioning piston portions 17b and 17c respectively in the pneumatic cylinder 13 and in the compressor cylinder 15. Portion 17b is of increased diameter, as compared with end 17a and portion 17c, and divides space within the pneumatic cylinder 13 into an outer bounce air chamber 13a and an inner scavenge and re-bounce air chamber 13b, while portion 17c divides space within the compressor cylinder 15 into an outer compressing chamber 15a and an inner balance chamber 15b. The free-piston unit 18 in extending lengthwise in a direction which is opposite to that of the piston unit 17 from the combustion chamber 12a similarly has cylinder space partitioning piston portions 18b and 18c respectively in air cylinder 14 and compressor cylinder 16. Space within the pneumatic cylinder 14 accordingly is partitioned into an outer bounce air chamber 14a and a scavenge re-bounce air chamber 14b by piston portion 18b which is of increased diameter as compared with portion 18c and end 18a. The piston portion 18c divides space within the compressor cylinder 16 into an outer compressing chamber 16a and an inner balance chamber 16b.

Th casing means 11 further provides annular intake plenum compartments 19 and 20 respectively having annular plenum chambers 19a and 20a outside the compressing chambers 15a and 16a. These plenum chambers have inlet openings 19b and 20b which communicate in any suitable manner with fluid such as a gaseous heat exchange fluid which is to be compressed, and further have a pressure-responsive anti-backflow means including one-way check valves 19c and 20c, which controls ingress ports from the respective intake plenum chambers leading into the corresponding compressing chambers 15a and 16a. Outside output ends of the compressing chambers are discharge plenum compartments 21 and 22, respectively, having discharge plenum chambers 21a and 22a. Pressure-responsive anti-backflow valves 21b and 22b control egress ports leading from the compressing chambers 15a and 16a to the discharge plenum chambers 21a and 22a. Outlet ports 23 and 24 from the plenum chambers 21a and 22a illustratively are interconnected by an output duct 25 communicating with line 26 thus for example placing the compressing chambers 15a and 16a in communication with the high pressure side of a heat exchange system whereby the pressure of fluid in this side of the system is a work load on the compressor sections of the engine compressor 10.

The reciprocative piston units 17 and 18 are synchronized by means including synchronizer bars 29 and 30 respectively fixed at ends to the piston portions 17b and 18b and racks 29a and 30a are on the bars at adjacent overlapping ends of the bars. The racks mesh with a synchronizing gear 31 on diametrically opposite sides of the gear and the gear is splined or otherwise fixed to a shaft 32 that is suitably journaled on the engine compressor casing means 11 for the gear and the shaft to rotate on a fixed axis in response to reciprocation of the piston units 17 and 18. The bars and pinion thus are so engaged as to maintain like phase reciprocation of the movements of these piston units.

The scavenge and rebounce air chambers 13b and 14b have air intake valves 13c and 14c which are one-way check valves controlling ports in the cylinder walls of these chambers so that air intake may be had through the ports from the atmosphere ambient to the engine compressor unit 10 to the scavenge and re-bounce air chambers 13b and 14b as volume of these chambers is increased by outward movements of the piston portions 17b and 18b and their related piston units. Still further, the scavenge and re-bounce air chambers 13b and 14b are in communication with a scavenge air box 33 within which there is a scavenge air chamber 33a. This communication is had through suitable ports leading from the scavenge and re-bounce air chambers into the air box chamber, the ports being controlled by one-way check valves 33b.

Combustion chamber 12a, for outer positions of the engine compressor pistons 17 and 18, is open to the air box chamber 33a through having air intake ports 12b in the wall of combustion power cylinder 12 and is open for exhausting gases from the combustion chamber through exhaust ports 12c in the wall of combustion power cylinder 12. The engine compressor 10 advantageously is of substantially symmetrical power rating and performance capability on opposite sides of a transverse plane through the midpoint of the length of the power cylinder 12. Thus, forces developed under stroke of the opposed pistons 17 and 18 are extremely well balanced keeping vibration of the engine compressor 10 bodily and on mountings at a minimum and improving the overall performance.

In order to have ignition, the internal combustion free-piston engine compressor 10 includes an igniting device 34 (see FIGURES 1 and 2) which is energized in timed relation with the stroke movements of the piston units 17 and 18. Since there is only limited flywheel effect to keep the piston units reciprocating in the event of combustion failure an adequate ignition potential along with proper coordination of the timing of this potential with fuel and pressure conditions in the combustion chamber 12a are important. The particular form of ignition device relied upon for this coordination in the present illustrative embodiment includes a rotor 35 which is suitably connected to rotate with the synchonizing gear shaft 32 as the gear shaft is oscillated in response to the drive of racks 29a and 30a in mesh with the synchronizing gear and while these racks are being reciprocated with the piston units 17 and 18.

Rotor 35 has a circular cam track which includes track portion 35a and track portion 35b, the latter being relatively short in length and of a somewhat greater radius than the track portion 35a. The two track portions just mentioned are transitionally interconnected by an inclined portion 35c of the track. The ignition unit also includes a housing 36 having a cover 36a joined with the remainder of the housing such as by machine screws 36b. The ignition unit is suitably mounted on the engine compressor casing 11 so that shaft 32 of the synchronizing gear extends through the housing 36 wherein the rotor 35 is accommodated along with other components of the igniting device which are now to be described. A hammer 37 having a cylindrical head 37a slidable within a bore 38 inside the housing is equipped with a roller 37b which is a follower for the cam track of rotor 35. A wall 39 situated on the opposite side of the hammer from the roller 37b has an annular groove 39a which accommodates one end of a helical spring 40. The spring biases the hammer 37 into contact of its roller with the cam track portion 35a.

Slidable in an aperture 39b in the wall 39 is the rod of an anvil member 41 which has an anvil face 41a and a socketed opposite end 41b. A shaped member 42 fixed inside of housing 36 provides a socket 42a which is aligned with the socket 41b and opposes the latter socket. A pair of piezoelectric crystals 43 have ends of like polarity received in the respective sockets which are electrically conductive and connected in any suitable manner such as through the casing 36 itself to a terminal 44 which for example is grounded to the combustion cylinder 12. Opposite like poles of the piezoelectric crystals 43 abut a pole plate 45 which has lead connection 45a to the engine compressor ignition switch 46. A helical spring 40a has one of its ends in an annular groove 39c in wall 39 while the opposite end of the spring presses against socketed member 41 so that the crystals 43 are firmly retained in the socket of this member and that of socketed portion 42.

Extending from the output side of the switch is a lead 47 which is connected to a sparking device such as a spark plug 48 having spark output within the combustion chamber 12a and ground connection to the combustion cylinder 12 on the opposite side of the spark gap from the potential of lead 47.

The arrangement is such that as the synchronizing gear shaft 32 is rotated in a direction corresponding to inward movement of the engine compressor pistons 17 and 18, the hammer roller 37b follows the cam track portion 35a until the inclined track portion 35c encounters the roller and imparts impetus to the hammer 37 which accordingly moves against the bias of spring 40 and impacts against the anvil face 41a of the anvil member 41. This impact imposes pressure upon the piezoelectric crystals 43 and a potential is momentarily produced and transmitted across the spark gap of the sparking device 48 to produce a spark which ignites a properly compressed charge of fuel and air in the combustion chamber 12a of the engine compressor. As the compression stroke of the engine compressor piston units 17 and 18 are thereafter being terminated, the track portion 35b of the ignition rotor allows movement of the hammer 37 away from the anvil face 41a a sufficient distance to relieve spark generating pressure on the piezoelectric crystals. Thus, rotor 35 when reversed in direction of rotation under the drive of racks 29a and 30a in mesh with the synchronizing gear 31 on the power stroke of pistons 17 and 18 moves to allow the hammer roller 37a to follow back down track portion 35c to the track portion 35a thereby conditioning the ignition device for the next compression stroke of the pistons 17 and 18 relative to combustion chamber 12a.

Fuel for combustion in the chamber 12a of the engine compressor 10 is supplied in quantity which is substantially constant from compression stroke to compression stroke of the piston units 17 and 18 and the supply is so timed in relation to scavenging of the combustion chamber and compression of fuel that the new charge of fuel will be available for ignition for the next power stroke of piston units 17 and 18. A fuel input device in the present embodiment includes an injector 50 (see FIGURES 1 and 3) suitably mounted on the combustion cylinder 12 and capable of pumping at intake pressure a volume of fuel such as natural gas and storing the fuel for the engine-compressor combustion chamber on each cycle of operation of the engine compressor. The fuel injector comprises within its casing 53 a fuel pump having a pump cylinder 51 and an actuating cylinder 52 separated from each other by means of an intermediate casing portion 53a in which there is a reduced bore 53b. A fuel injecting piston unit 54 common to both of the cylinders 51 and 52 includes an interconnecting piston rod 54a for a pump piston 54b and an actuating piston 54c of the injector. The actuating piston partitions space within the actuating cylinder 52 into pneumatic compartments 52a and 52b while pump piston 54b divides space within the pump cylinder into a pumping chamber 51a and an actuating chamber 51b. A fuel inlet line 55 leading from suitable fuel supply (not shown) to the pumping chamber 51a includes a pressure-responsive one-way check valve 55a such as a reed valve which opens to the pumping chamber 51a. A pressure-responsive fuel output poppet valve 56 communicating with the combustion chamber 12a of the engine compressor controls an outlet opening 51c from the pumping chamber 51a and the valve is normally biased closed by means of a spring 56a. An open bleed line 57 interconnecting the fuel line 55 and chamber 51b of the pump amounts to a relief vent preceding the check valve 55a in the direction of fuel supply. The vent allows pressure in chamber 51b to adjust to fuel intake pressure for both strokes in each cycle of the operation of the pump piston 54b.

A helical spring 58 within pneumatic compartment 52a of the fuel injector is seated at one end in an annular groove 53d of the injector casing partition 53a, and the spring presses at its opposite end against actuating piston 54c. An extension 53c of the injector casing has axially aligned bores 68a and 68b which slidably accommodate the opposite end portions of a stop rod 67. An inner end face of the stop rod projects inside the pneumatic chamber 52b. There are rack teeth 67b along the length of the stop rod and these teeth are in mesh with a gear segment 69, which is journaled in the casing portion 53c and operatively connected with a fuel control lever 66 of the injector. The fuel intake and output capacity of the injector may be varied by re-setting the position of the stop rod 67 through adjusting the position of the fuel lever 66. Rotation of the gear segment by operation of the fuel lever in fact slidably adjusts the stop rod and sets the position of the stop rod face 67a in the chamber 52b for the injecting device 50 thereafter to discharge as a substantially constant quantity any one of a possible number of quantities of fuel to the combustion chamber 12a for each cycle of a series of cycles of operation of the engine compressor 10. A stop ledge 53e integral with casing 53 and projecting radially into chamber 52a limits movement of the fuel injecting piston unit 54 to opposite end stroke position.

A control air inlet chamber 60 within the casing of the injector is in communication with the scavenge and rebounce air chambers 13b and 14b of the engine compressor 10 through an air inlet line 59 (see FIGURE 1) which interconnects the chambers 13b and 14b and is tapped by branch line 59a leading to orifices 61 and 62 respectively communicating with the pneumatic compartments 52a and 52b in the actuating cylinder of the injector. Orifice 62, preferably, is a relatively constricted orifice for introducing lag as compared with the orifice 61, and one-way check valves 61a and 62a, which illustratively are reed valves, correspond to and control the latter orifices. An outlet 63 from the pneumatic compartment 52a is connected by line 64 with a timing valve which controls opening and closing of this outlet.

The pneumatic compartment 52b receives air from the scavenge re-bounce air chambers 13b and 14b through line 59, chamber 60, and valve 62a and stores this air in pressure opposition to the bias of helical spring 58. However, line 59a also is open to the pneumatic compartment 52a, this through orifice 61 which is controlled by valve 61a and, as pressure is equalized in the compartments 51a and 52b, the force of spring 58 controls to actuate the injector piston unit 54 to a position where abutment of the unit is had against face 67a of stop rod 67. In this movement, volume increase in the pump chamber 51a of the injector promotes opening of the one-way check valve 55a and a measured charge of fuel accordingly enters the latter chamber.

Injection of fuel into the combustion chamber 12a of the free-piston engine compressor 10 will occur through discharge opening 51c which is opened by movement of poppet valve 56 against its biasing spring 56a under pressure of the fuel in the pump chamber 51a when pressure in the pneumatic compartment 52a is released. This pressure release is governed by operation of the timing valve 65. The injecting movement of the injecting piston unit 54 terminates when the latter unit encounters stop 53e.

To give a general view of pumping, bounce, scavenging and other general operations of the free-piston engine compressor 10, let it be assumed for the moment that the piston units 17 and 18 are at an outer dead position of piston travel. Pneumatic fluid in the outer bounce chambers 13a and 14a has stored energy to return the piston units to inner dead position. In moving inward the piston units 17 and 18 cover the scavenge air inlet ports 12b and exhaust ports 12c, immediately after which fuel is injected and these piston units continue to move toward each other compressing the charge in the combustion chamber 12a. Meanwhile, piston components 17b and 18b act on air in chambers 13b and 14b to force air into the air box chamber 33a through ports controlled by one-way check valves 33b. As the piston units 17 and 18 move farther inward the ports controlled by the check valves 33b are covered by the piston components 17b and 18b and air in advance of the related piston units then is compressed in chambers 13b and 14b to store pneumatic re-bounce energy to aid the next power stroke of the piston units 17 and 18. The inward stroke of the piston units 17 and 18 also brings about volume increase in the compressing chambers 15a and 16a and valves 19c and 20c accordingly open to admit low pressure gaseous fluid from the intake plenum chambers 19a and 20a to the compressing chamber. The balance chambers 15b and 16b advantageously are vented through lines, having one-way check valves 15c and 16c, and communicating with the respective intake plenum chambers 19a and 20a. This maintains low pressure in the balance chambers referenced to the intake pressure. Discharge check valves 21b and 22b remain closed during the intake of gaseous fluid to the chambers 15a and 16a.

As the inner dead position of piston units 17 and 18 is approached following closure of ports 12b and 12c and the injection of fuel by the injecting device 50, the air-fuel mixture in the combustion chamber is ignited by the sparking device 34 and the included plug 48 and the energy thus produced drives the piston units 17 and 18 in a power stroke which is aided initially by the re-bounce pneumatic pressure in chambers 13b and 14b. The outlet valves 21b and 22b open the discharge ports from compressing chambers 15a and 16a and fluid from these chambers is discharged at a discharge pressure into plenum chambers 21a and 22a and through outlet ports 23 and 24, the intake valves 19c and 20c being closed. As the power stroke progresses air is taken into the scavenge and re-bounce air chambers 13b and 14b through valves 13c and 14c while the check valves 33b controlling outlets from these chambers to the air box chamber 33a are closed. Continued movement of the piston units 17 and 18 causes the scavenge air inlet ports 12b and exhaust ports 12c to open and air under existing pressure in the air box chamber 33a is admitted through ports 12b in fresh supply and the combustion gases in chamber 12a have exit through the outlet ports 12c. The outer bounce air chambers 13a and 14a undergo decrease in volume as the piston units 17 and 18 approach outer dead position and pneumatic energy accordingly is stored for the ensuing return stroke of the engine piston units.

Timing valve 65 (see FIGURES 3 and 3A) of the fuel injector 50 includes a stationary cage 70 in which there is a discharge port 70a leading for example to atmosphere ambient to the engine compressor 10. The stationary cage supports within a cylindrical bore 70b thereof a hollow cylindrical rotatable cage 71, having a radial outlet port 71a which by rotation of the rotatable cage is adapted to be aligned with port 70a in the stationary cage and is shut off by the stationary cage in the absence of alignment of the ports.

A radial projection 71b of the rotatable cage extends outwardly through a peripheral slot 70c in the wall of the stationary cage. One end 70e of the slot 70c acts as an abutment for the radial projection 71b to stop rotation of the rotatable cage at a point where outlet 71a is aligned with outlet 70a of the respective cages. The arcuate length of slot 70c on the periphery of the stationary cage is sufficient for ports 70a and 71a to be out of alignment and thus closed with respect to each other when the radial projection 71b has been rotated into abutment against edge 70d of the slot.

A rotary cylindrical core 72 of the valve is in driven connection with shaft 32 of the synchronizing gear 31 and thus will oscillate with the gear under the drive of the gear. The core 72 is received rotatably within bore 71f of the cage 71; however, the resistance of the core to rotate relative to the cage 71 is greater than the resistance of cage 71 to rotate within cage 70. These differences in resistance may be assured simply by differences in coefficients of friction of the adjacent members or in whole or in part by any other suitable arrangement whereby the differences are properly introduced.

The rotor 72 has a central input opening 72a communicating with the output line 64 from pneumatic compartment 52a, and has a radially open sector 72b. From the FIGURE 3A positions of the core 72 and rotary cage 71, corresponding to outer dead position of the engine compressor piston units 17 and 18, a counterclockwise rotation of the core 72 at the outset of the return stroke of the engine compressor piston units is effected under drive of the synchronizing gear 31 and brings the radial projection 71b of the rotatable cage into contact with the abutment 70e, thus aligning ports 70a and 71a, and then a continued rotation of the core in the counterclockwise direction provides the FIGURE 3B position of the valve wherein sector 72b is open to the ports 70a and 71a. This alignment is timed to occur immediately after closure of the scavenge air ports 12b and exhaust ports 12c of the combustion chamber 12a by the piston units 17 and 18 on return stroke of these piston units, and the alignment vents the pneumatic compartment 52a to a relatively low pressure. The pressure of fluid stored in the pneumatic compartment 52b of the injector then prevails against spring 58 and exercises a force which drives the injector piston unit 54 in a fuel expelling stroke in which a measured quantity of fuel in the pump chamber 51a is discharged through port 51c controlled by the poppet valve 56, while the one-way check valve 55a remains closed. As the valve core 72 continues to rotate counterclockwise to the FIGURE 3C position the core sector passes the aperture 71a by relative rotation with respect to the rotatable cage 71 while the latter cage remains fixed against rotation in the counterclockwise direction by reason of projection 71b being restrained by abutment against edge 70e of the slot 70c. After shut off between sector 72b and port 71a occurs, in the manner indicated, fluid from the scavenge and re-bounce cylinders 13b and 14b reaches a re-bounce pressure stage following closure of valves 33b between the scavenge air and re-bounce chambers 13b and 14b and the air box 33, and the pressure is effective to open valves 61a and 62a with the result that fluid pressure on both sides of the actuating pistons 54c is balanced making spring 58 effective to drive the injector piston unit 54 in an intake stroke during which time another measured quantity of fuel is taken into the pump chamber 51a through check valve 55a. At the end of this stroke of the injector piston unit 54 the latter unit is in abutment against the face 67a of the stop rod 67. Meanwhile, fuel in the engine compressor combustion chamber 12a is compressed and ignition occurs by operation of the igniting device 34 in the manner hereinbefore described.

Figure 3A:
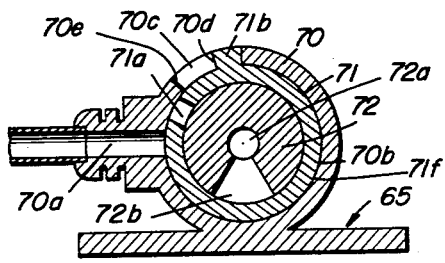
FIGURE 3 depicts fuel injecting means of the engine compressor, mainly in sectional elevation, and a control valve of the injector in full elevation.
Figure 3B:
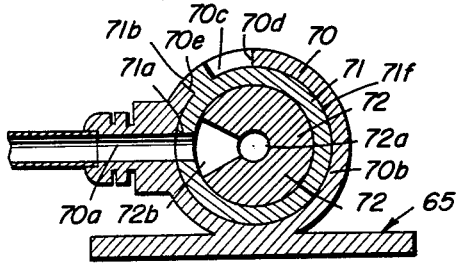
Figure 3C:
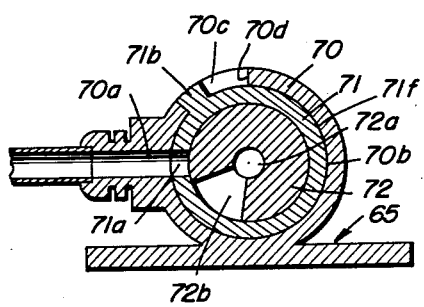
Figure 3D:
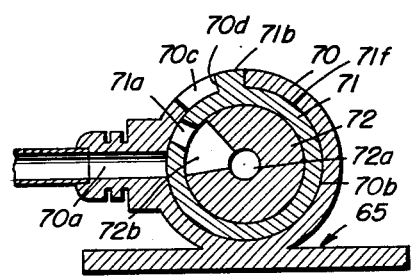

At the outset of the power stroke of the engine compressor piston units 17 and 18, the direction of rotation of valve core 72 is reversed to clockwise rotation from the FIGURE 3C position and intially the rotary cage 71 and core 72 rotate as a unit in the stationary cage 70, whereby radial projection 71b advances from stop 70e to stop 70d while port 71a moves away from port 70a and the latter port is closed off by the rotary cage from the injector chamber 52a. Chamber 52a in fact remains closed throughout the power stroke of the free-piston engine compressor 10, during which time core 72 continues to rotate clockwise as viewed in FIGURE 3D. The next return stroke of the piston units 17 and 18 is accompanied by counterclockwise rotation of valve core 72 and the rotatable cage 71 once more as a unit until the radial projection 71b of the rotating cage strikes abutment 70e of the stationary cage, following which counterclockwise rotation of core 70 continues with respect to cage 71 until sector 72b comes into alignment again with ports 70a and 71a to vent the pneumatic chamber 52a of the fuel injector, thus permitting the injector piston unit 54 to effect another stroke discharging fuel into the engine compressor combustion chamber 12a.

In order to maintain a substantially constant inner dead position of the piston units 17 and 18 under work load which may vary from cycle to cycle the free-piston engine compressor 10 includes bounce fluid mass control means whereby the mass of bounce fluid against which the engine compressor piston units 17 and 18 are to work on power stroke varies at reference pressure inversely as a function of the discharge pressure encountered by the compressor pistons 17c and 18c. Bounce fluid mass control means 80 (see FIGURES 1 and 4) is provided having a valve 81 in which a fixed cage 82 of generally rectangular cross section is connected from opposite ports 82a and 82b thereof to the outer bounce air chambers 13a and 14a of the engine compressor unit 10 by means of fluid supply lines 83 and 84 respectively. A cyclindrical rotor 85 journaled sealingly for rotation in either of selected opposite directions within the stationary cage, has an integral lever arm 85c projecting outside the stationary cage and the rotor also has ports 85a and 85b which communicate from inside the stationary cage with the ports 82a and 82b of the cage. A cylindrical core 86 within the rotor 85 is connected with shaft 32 of the synchronizing gear so as to oscillate within the rotor in phase with the stroke movements of the engine compressor piston units 17 and 18. Core 86 takes a position recurrently as a particular magnitude of volume of each of the pneumatic bounce chambers 13a and 14a recurs from cycle to cycle of operation of the free-piston engine compressor 10. An axial bore 86c in the core of the valve leads to atmosphere or to some other suitable reference fluid having substantially constant pressure, and communicates with radial bores 86a and 86b for being connected with the bounce chambers 13a and 14a when these bores are aligned with ports 85a and 85b of the valve rotor 85. When the latter bores and ports are not aligned the wall of rotor 85 is effective for shutting off the bounce chambers 13a and 14a from the bore 86.

A fluid motor 87 of the bounce fluid mass control means 80 has a piston 88 slidably within a casing 89. A rod 92 of the piston is pivotally connected at its end 93 with the arm 85c of valve 81. A driving bellows 94, sealingly engaged with the housing at one end of the housing, is drivingly and sealingly engaged with the piston rod 92. A pressure chamber 90 which extends on both sides of the piston 88 by leakage of fluid being tolerated past the piston, is adapted as by means of line 95 to communicate with the discharge side of the outer compressing chambers 15a and 16a of the engine compressor 10 so that the bellows 94 will sense this pressure in the motor chamber 90 and move, accordingly to drive the rod 92 which is guided by the movement of piston 88 slidably in the casing 89. A helical spring having opposite ends respectively engaging the casing and the piston, biases the piston and its rod in an inward direction which is toward the casing.

Assuming that the engine compressor pistons 17 and 18 are undergoing power stroke against discharge pressure of the outer compressing chambers 15a and 16a which remains constant with respect to at least the preceding power stroke, the discharge pressure reflected in chamber 90 of the motor 87 will remain at a value where the position of lever arm 85c is unaltered and valve core 86c will rotate bringing bores 86a and 86b past ports 85a and 85b at the same position in power stroke of the piston units 17 and 18 as this alignment occurred in the preceding power stroke of the piston units. The average bounce pressure in the outer bounce air chambers 13a and 14a for each power stroke therefore remains constant in view of the constant discharge pressure encountered from cycle to cycle on the output side of the compressor means of the engine compressor 10. During these cycles the stroke length of the piston units 17 and 18 remains substantially constant for substantially constant combustion power input per cycle to these piston units through keeping the charges of fuel substantially constant and the ignition of these charges consistent with producing this constant power input, although the particular work load may vary. It now will be assumed that an optimum work load is being accommodated by the engine compressor 10. When in a cycle of the free-piston engine compressor a decrease in compressor discharge pressure from optimum discharge pressure occurs, this decrease is transmitted to pressure chamber 90 of motor 87 and the biasing spring 91 adjusts the position of piston 88 inward for the motor to drive arm 85c in a counterclockwise direction (FIGURE 4) with respect to core 86 thus changing the relative positions of ports 85a and 85b with respect to bores 86a and 86b so that venting of the outer bounce chambers 13a and 14a through bore 86c will be earlier in the power stroke of the piston unit 17 and 18 of the engine compressor and will provide a larger mass of pneumatic fluid at reference pressure in each of the bounce chambers 13a and 14a than had the venting been later in the power stroke. As the piston units 17 and 18 then continue to move outward in this same power stroke, bores 86a and 86b travel beyond being aligned with ports 85a and 85b and thus the outer bounce chambers 13a and 14a develop an average bounce pressure to bring the piston units 17 and 18 back to substantially the same inner dead position as did prevail under the assumed optimum discharge pressure condition of operation previously referred to. Assume now that an increase in discharge pressure from the previously mentioned optimum discharge pressure sensed by the motor bellows 94 is encountered. The valve rotor 85 accordingly moves in a counterclockwise direction (FIGURE 4) by outward displacement of the motor bellows against the spring 89. The positions of ports 85a and 85b therefore are changed so that alignment of these bores 86a and 86b of the valve core 86 is accomplished later during the power stroke of the engine compressor piston units 17 and 18. The alignment again brings the outer bounce chambers 13a and 14a into communication with vent bore 86c of the valve core, but the venting of the outer bounce chambers provides a relatively small mass of pneumatic fluid at reference pressure inside each of the bounce chambers, which masses, on shut off of the latter chambers from the vent line by continued rotation of the valve core 86 during this same power stroke, develop a lower average bounce pressure in the outer bounce chambers for the corresponding stroke of the engine compressor. The bounce pressure drives the piston units 17 and 18 in their return stroke to substantially the same inner dead position as prevailed during the operation of engine compressor 10 against the optimum work load previously mentioned. No substantial change in the inner dead position of the piston units 17 and 18 is suffered when the output capacity of the engine compressor 10 is modulated by modulation of the combustion power input within a permissible range.

It will also be noted that in the present embodiment the outer bounce air chambers 13a and 14a are vented to the reference fluid on each return stroke of the free-piston units 17 and 18 as core 86 rotates in a reversed direction of rotation compared with rotation of this core on power stroke of these piston units. Thus, the outer bounce air chambers 13a and 14a are vented and closed to the reference fluid on each power stroke and each return stroke of the engine compressor piston means 17 and 18. In certain embodiments, still in accordance with the invention, the venting of the pneumatic bounce space to reference pressure may be only on the return stroke or only on the power stroke of the engine compressor piston means, preferably on each cycle of the engine compressor 10, thus to vary the mass of bounce air available at reference pressure in the pneumatic bounce space inversely as a function of the work load encountered by the engine compressor on output.

As hereinbefore noted, the engine compressor 10 is highly useful for compressing gaseous fluid and in this regard the engine compressor 10 having its outlet plenum chambers openings 23 and 24 interconnected by duct 25 is in system through this duct and lead line 26 as a power unit in a heat exchange system wherein a gaseous heat exchange fluid such as Freon is circulated by the compressor sections of this power unit. Thus, fluid line 26 is in input communication with a condenser 100 which feeds on its output side through line 101 to an expansion valve 102. The expansion valve has output through line 103 which in turn is connected for input to an evaporator 104. A return line 105 leading from the output side of the evaporator is connected to a duct 106 which interconnects the inlet openings 19b and 20b of the respective intake plenum chambers of the compressor sections. Accordingly, operation of the engine compressor 10 effects circulation of the heat exchange fluid from the compressing chambers 15a and 16a by compressing the fluid in these chambers on power stroke for the fluid to discharge through outlet valves 21b and 22b into the output plenum chambers 21a and 22a. From these chambers the fluid passes into duct 25, thence line 26 into the condenser 100 and builds up a work load pressure on the expansion valve 102. From the expansion valve the fluid passes through line 103, evaporator 104 and thence through line 105 to the duct 106 which communicates with the intake plenum chambers 19a and 20a from which fluid enters the compressing chambers 15a and 16a through check valves 19c and 20c on return stroke of the piston units 17 and 18 in preparation for the next power stroke.

Full power operation under various pressures of the heat exchange fluid on output side of the compressing chambers 15a and 16a and involving different evaporation and condenser temperatures, in each instance, is illustrated by FIGURE 5 of the accompanying drawing. The higher pressure ratios cause a decrease in volumetric capacity of the compressor; however, in view of the regulating effect of bounce control means 80 upon bounce pressure in chambers 13a and 14a the compressor work remains substantially constant for constant combustion power input from the combustion chamber 12a from cycle to cycle of the engine compressor. It is found that changes in the pressure of fluid entering the compressing chambers 15a and 16a from the intake plenum chambers 19a and 20a have no appreciable effect upon inner dead position of the piston units 17 and 18. Thus, it will be seen that although the combustion power produced by the engine compressor must always be balanced by the load for stable operation, the free-piston engine compressor 10 is so characterized that it is virtually self-compensating for changes in power input and changes in the compressor intake and discharge pressures. With regard to those embodiments of the engine compressor wherein power combustion power input is modulated from one substantially constant value from cycle to cycle of the engine compressor to another substantially constant value from cycle to cycle of the engine compressor, reference now is had to FIGURE 6 and the compressor pressure-stroke diagrams therein presented. Changes in stroke with changes in power level are tolerated off a substantially constant inner dead position of the engine compressor piston means. This will be noted from FIGURE 6 because the represented volumetric flow rate (the length of the flat portion on the bottom of each loop) is approximately proportional to the duration of the intake process.

As many possible embodiments of the invention may be made and as many possible changes may be made in the embodiments herein set forth, it will be distinctly understood that all matter described herein is to be interpreted as illustrative and not as a limitation.

We claim:

1. A two-stroke-cycle, free-piston internal combustion engine compressor comprising cylinder means, engine compressor free-piston means reciprocatively within said cylinder means and having faces respectively forming with said cylinder means a combustion chamber, a pneumatic bounce chamber having a vent, and a gaseous fluid compressing chamber; fuel input means in output communication with said combustion chamber and having substantially the same quantity output of fuel to said combustion chamber for each cycle of a series of cycles of the engine operation for said free-piston means to operate on substantially constant combustion power input for power stroke throughout said series of cycles of the engine, said free-piston means introducing on each power stroke an increase in volume of the combustion chamber and decrease in volumes of said pneumatic bounce chamber and compressing chamber respectively, and on each return stroke a decrease in volume of the combustion chamber and increase in volumes of said pneumatic bounce chamber and compressing chamber respectively; pressure-responsive gaseous fluid ingress and anti-backflow means in communication with said compressing chamber for fluid to enter said compressing chamber in response to return stroke of said free-piston means; pressure-responsive gaseous fluid egress and anti-backflow means in communication with said compressing chamber for fluid to be discharged from said compressing chamber in response to next power stroke of said free-piston means and whereupon said piston means on the power stroke transmits energy to storage in fluid in said pneumatic bounce chamber for exertion to the next return stroke of said free-piston means; and bounce control means for the engine to maintain substantially constant inner dead position of said piston means in said series of cycles of the engine while length of stroke of said piston means varies upon variation in load being encountered by said piston means through said pressure responsive gaseous fluid egress and anti-backflow means, said bounce control means including vent control means operatively communicating with said bounce chamber vent for said vent to be opened and closed, said vent control means comprising synchronously movable means synchronously operatively interconnected with said piston means, for moving in synchronism with said piston means in cycles of said series of cycles of the engine through positions wherein said vent is open and to positions for said vent and pneumatic fluid having reference pressure in said bounce chamber to be closed for said piston means thereafter to work against said fluid in said bounce chamber in power stroke, and said vent control means further comprising movable load responsive means communicating with said compressing chamber, for taking any of a series of positions relative to said synchronously movable means in response to load encountered by said piston means through said pressure-responsive gaseous fluid egress and anti-backflow means, and communicating with said synchronously movable means for said vent to be opened, and for closing said vent and pneumatic fluid at said reference pressure in said bounce chamber on movement of said synchronously movable means to one of said positions of said synchronously movable means wherein said vent is to be closed consistent with varying the mass of pneumatic fluid in said bounce chamber inversely with load encountered by said piston means through said pressure-responsive egress and anti-backflow means, for piston means thereafter to work in power stroke against said mass of fluid.

2. A two-stroke-cycle, free-piston internal combustion engine compressor comprising cylinder means, engine compressor free-piston means reciprocatively within said cylinder means and having faces respectively forming with said cylinder means a combustion chamber, a pneumatic bounce chamber having a vent, and a gaseous fluid compressing chamber; fuel input and power level selector means including fuel input means in output communication with said combustion chamber and having substantially the same quantity output of fuel to said combustion chamber for each cycle of a series of cycles of the engine operation for said free-piston means to operate on substantially constant combustion power input for power stroke throughout said series of cycles of the engine, and power level selector means for the quantity of fuel in said combustion chamber to be varied selectively to achieve different substantially constant power input levels for a corresponding series of cycles of operation of the engine, said free-piston means introducing on each power stroke an increase in volume of the combustion chamber and decrease in volumes of said pneumatic bounce chamber and compressing chamber respectively, and on each return stroke a decrease in volume of the combustion chamber and increase in volumes of said pneumatic bounce chamber and compressing chamber respectively; pressure-responsive gaseous fluid ingress and anti-backflow means in communication with said compressing chamber for fluid to enter said compressing chamber in response to return stroke of said free-piston means; pressure-responsive gaseous fluid egress and anti-backflow means in communication with said compressing chamber for fluid to be discharged from said compressing chamber in response to next power stroke of said free-piston means and whereupon said piston means on the power stroke transmits energy to storage in fluid in said pneumatic bounce chamber for exertion to the next return stroke of said free-piston means; and bounce control means for the engine to maintain substantially constant inner dead position of said piston means in the selected said series of cycles of the engine while length of stroke of said piston means varies upon variation in load being encountered by said piston means through said pressure responsive gaseous fluid egress and anti-backflow means, said bounce control means including vent control means operatively communicating with said bounce chamber vent for said vent to be opened and closed, said vent control means comprising synchronously movable means synchronously operatively interconnected with said piston means, for moving in synchronism with said piston means in cycles of said selected series of cycles of the engine through positions wherein said vent is open and to positions for said vent and pneumatic fluid having reference pressure in said bounce chamber to be closed for said piston means thereafter to work against said fluid in said bounce chamber in power stroke, and said vent control means further comprising movable load responsive means communicating with said compressing chamber, for taking any of a series of positions relative to said synchronously movable means in response to load encountered by said piston means through said pressure-responsive gaseous fluid egress and anti-backflow means, and communicating with said synchronously movable means for said vent to be opened, and for closing said vent and pneumatic fluid at said reference pressure in said bounce chamber on movement of said synchronously movable means to one of said positions of said synchronously movable means wherein said vent is to be closed consistent with varying the mass of pneumatic fluid in said bounce chamber inversely with load encountered by said piston means through said pressure-responsive egress and anti-backflow means, for said piston means thereafter to work in power stroke against said mass of fluid.

3. A two-stroke-cycle, free-piston internal combustion engine compressor comprising cylinder means, engine compressor free-piston means reciprocatively within said cylinder means and having faces respectively forming with said cylinder means a combustion chamber, a pneumatic bounce chamber having a vent, and a gaseous fluid compressing chamber; fuel input and power level selector means including fuel input means in output communication with said combustion chamber and having substantially the same quantity output of fuel to said combustion chamber for each cycle of a series of cycles of the engine operation for said free-piston means to operate on substantially constant combustion power input for power stroke throughout said series of cycles of the engine, and power level selector means for the quantity of fuel to said combustion chamber to be varied selectively to achieve a different substantially constant combustion power input level for a corresponding series of cycles of operation of the engine, said free-piston means introducing on each power stroke an increase in volume of the combustion chamber and decrease in volumes of said pneumatic bounce chamber and compressing chamber respectively, and on each return stroke a decrease in volume of the combustion chamber and increase in volumes of said pneumatic bounce chamber and compressing chamber respectively; pressure-responsive gaseous fluid ingress and anti-backflow means in communication with said compressing chamber for fluid to enter said compressing chamber in response to return stroke of said free-piston means; pressure-responsive gaseous fluid egress and anti-backflow means in communication with said compressing chamber for fluid to be discharged from said compressing chamber in response to next power stroke of said free-piston means and whereupon said piston means on the power stroke transmits energy to storage in fluid in said pneumatic bounce chamber for exertion to the next return stroke of said free-piston means; and bounce control means for the engine to maintain substantially constant inner dead position of said piston means through both of said series of cycles of the engine while length of stroke of said piston means varies upon variation in load being encountered by said piston means through said pressure responsive gaseous fluid egress and anti-backflow means, said bounce control means including vent control means operatively communicating with said bounce chamber vent for said vent to be opened and closed, said vent control means comprising synchronously movable means synchronously operatively interconnected with said piston means, for moving in synchronism with said piston means in cycles of said series of cycles of the engine through positions wherein said vent is open and to positions for said vent and pneumatic fluid having reference pressure in said bounce chamber to be closed for said piston means thereafter to work against said fluid in said bounce chamber in power stroke, and said vent control means further comprising movable load responsive means communicating with said compressing chamber, for taking any of a series of positions relative to said synchronously movable means in response to load encountered by said piston means through said pressure-responsive gaseous fluid egress and anti-backflow means, and communicating with said synchronously movable means for said vent to be opened, and for closing said vent and pneumatic fluid at said reference pressure in said bounce chamber on movement of said synchronously movable means to one of said positions of said synchronously movable means wherein said vent is to be closed consistent with varying the mass of pneumatic fluid in said bounce chamber inversely with load encountered by said piston means through said pressure-responsive egress and anti-backflow means, for said piston means thereafter to work in power stroke against said mass of fluid.

4. A two-stroke-cycle, free-piston internal combustion engine compressor comprising cylinder means, engine compressor free-piston means reciprocatively within said cylinder means and having faces respectively forming with said cylinder means a combustion chamber, a pneumatic bounce chamber having a vent, and a gaseous fluid compressing chamber; fuel input means in output communication with said combustion chamber and having substantially the same quantity output of fuel to said combustion chamber for each cycle of a series of cycles of the engine operation for said free-piston means to operate on substantially constant combustion power input for power stroke throughout said series of cycles of the engine, said free-piston means introducing on each power stroke an increase in volume of the combustion chamber and decrease in volumes of said pneumatic bounce chamber and compressing chamber respectively, and on each return stroke a decrease in volume of the combustion chamber and increase in volumes of said pneumatic bounce chamber and compressing chamber respectively; pressure-responsive gaseous fluid ingress and anti-backflow means in communication with said compressing chamber for fluid to enter said compressing chamber in response to return stroke of said free-piston means; pressure-responsive gaseous fluid egress and anti-backflow means in communication with said compressing chamber for fluid to be discharged from said compressing chamber in response to next power stroke of said free-piston means and whereupon said piston means on the power stroke transmits energy to storage in fluid in said pneumatic bounce chamber for exertion to the next return stroke of said free-piston means; and bounce control means for the engine to maintain substantially constant inner dead position of said piston means from cycle to cycle of said series of cycles of the engine while length of stroke of said piston means varies upon variation in load being encountered by said piston means through said pressure responsive gaseous fluid egress and anti-backflow means, said bounce control means including vent control means operatively communicating with said bounce chamber vent for said vent to be opened and closed, said vent control means comprising synchronously movable means synchronously operatively interconnected with said piston means, for moving in synchronism with said piston means in each cycle of said series of cycles of the engine through position wherein said vent is open and to position for said vent and pneumatic fluid having reference pressure in said bounce chamber to be closed for said piston means thereafter to work against said fluid in said bounce chamber in power stroke, and said vent control means further comprising movable load responsive means communicating with said compressing chamber, for taking any of a series of positions relative to said synchronously movable means in response to load encountered by said piston means through said pressure-responsive gaseous fluid egress and anti-backflow means, and communicating with said synchronously movable means for said vent to be opened, and for closing said vent and pneumatic fluid at said reference pressure in said bounce chamber on movement of said synchronously movable means to one of said positions of said synchronously movable means wherein said vent is to be closed consistent with varying the mass of pneumatic fluid in said bounce chamber inversely with load encountered by said piston means through said pressure-responsive egress and anti-backflow means, for said piston means thereafter to work in power stroke against said mass of fluid.

5. A two-stroke-cycle, free-piston internal combustion engine compressor comprising cylinder means, engine compressor free-piston means reciprocatively within said cylinder means and having faces respectively forming with said cylinder means a combustion chamber, a pneumatic bounce chamber having a vent, and a gaseous fluid compressing chamber; fuel input means in output communication with said combustion chamber and having substantially the same quantity output of fuel to said combustion chamber for each cycle of a series of cycles of the engine operation for said free-piston means to operate on substantially constant combustion power input for power stroke throughout said series of cycles of the engine, said free-piston means introducing on each power stroke an increase in volume of the combustion chamber and decrease in volumes of said pneumatic bounce chamber and compressing chamber respectively, and on each return stroke a decrease in volume of the combustion chamber and increase in volumes of said pneumatic bounce chamber and compressing chamber respectively; pressure-responsive gaseous fluid ingress and anti-backflow means in communication with said compressing chamber for fluid to enter said compressing chamber in response to return stroke of said free-piston means; pressure-responsive gaseous fluid egress and anti-backflow mean in communication with said compressing chamber for fluid to be discharged from said compressing chamber in response to next power stroke of said free-piston means and whereupon said piston means on the power stroke transmits energy to storage in fluid in said pneumatic bounce chamber for exertion to the next return stroke of said free-piston means; and bounce control means for the engine to maintain substantially constant inner dead position of said piston means from cycle to cycle of said series of cycles of the engine while length of stroke of said piston means varies upon variation in load being encountered by said piston means through said pressure responsive gaseous fluid egress and anti-backflow means, said bounce control means including vent control means operatively communicating with said bounce chamber vent for said vent to be opened and closed, said vent control means comprising synchronously movable means synchronously operatively interconnected with said piston means, for moving in synchronism with said piston means in each power stroke of said piston means in said series of cycles of the engine through position wherein said vent is open and to position for said vent and pneumatic fluid having reference pressure in said bounce chamber to be closed for said piston means thereafter to work against said fluid in said bounce chamber in power stroke, and said vent control means further comprising movable load responsive means communicating with said compressing chamber, for taking any of a series of positions relative to said synchronously movable means in response to load encountered by said piston means through said pressure-responsive gaseous fluid egress and anti-backflow means, and communicating with said synchronously movable means for said vent to be opened, and for closing said vent and pneumatic fluid at said reference pressure in said bounce chamber on movement of said synchronously movable means to one of said positions of said synchronously movable means wherein said vent is to be closed consistent with varying the mass of pneumatic fluid in said bounce chamber inversely with load encountered by said piston means through said pressure-responsive egress and anti-backflow means, for said piston means thereafter to work in power stroke against said mass of fluid.

6. A two-stroke-cycle, free-piston internal combustion engine compressor comprising cylinder means, engine compressor free-piston means reciprocatively within said cylinder means and having faces respectively forming with said cylinder means a combustion chamber, a pneumatic bounce chamber having a vent, and a gaseous fluid compressing chamber; fuel input means in output communication with said combustion chamber and having substantially the same quantity output of fuel to said combustion chamber for each cycle of a series of cycles of the engine operation for said free-piston means to operate on substantially constant combustion power input for power stroke throughout said series of cycles of the engine, said free-piston means introducing on each power stroke an increase in volume of the combustion chamber and decrease in volumes of said pneumatic bounce chamber and compressing chamber respectively, and on each return stroke a decrease in volume of the combustion chamber and increase in volumes of said pneumatic bounce chamber and compressing chamber respectively; pressure-responsive gaseous fluid ingress and anti-backflow means in communication with said compressing chamber for fluid to enter said compressing chamber in response to return stroke of said free-piston means; pressure-responsive gaseous fluid egress and anti-backflow means in communication with said compressing chamber for fluid to be discharged from said compressing chamber in response to next power stroke of said free-piston means and whereupon said piston means on the power stroke transmits energy to storage in fluid in said pneumatic bounce chamber for exertion to the next return stroke of said free-piston means; and bounce control means for the engine to maintain substantially constant inner dead position of said piston means from cycle to cycle of said series of cycles of the engine while length of stroke of said piston means varies upon variation in load being encountered by said piston means through said pressure responsive gaseous fluid egress and anti-backflow means, said bounce control means including vent control means operatively communicating with said bounce chamber vent for said vent to be opened and closed, said vent control means comprising synchronously movable means synchronously operatively interconnected with said piston means, for moving in synchronism with said piston means in each power stroke and each return stroke of said piston means in said series of cycles of the engine through position wherein said vent is open and to position for said vent and pneumatic fluid having reference pressure in said bounce chamber to be closed for said piston means to encounter reference pressure in said bounce chamber in each said return stroke and thereafter work against said fluid in said bounce chamber in power stroke, and said vent control means further comprising movable load responsive means communicating with said compressing chamber, for taking any of a series of positions relative to said synchronously movable means in response to load encountered by said piston means through said pressure-responsive gaseous fluid egress and anti-backflow means, and communicating with said synchronously movable means for said vent to be opened, and for closing said vent and pneumatic fluid at said reference pressure in said bounce chamber on movement of said synchronously movable means to one of said positions of said synchronously movable means wherein said vent is to be closed for power stroke of said piston means consistent with varying the mass of pneumatic fluid in said bounce chamber inversely with load encountered by said piston means through said pressure-responsive egress and anti-backflow means, for said piston means thereafter to work in power stroke against said mass of fluid.

7. A two-stroke-cycle free-piston internal combustion engine compressor of claim 1, wherein said piston means more particularly includes cylinder partitioning means within a compressor cylinder of said cylinder means, said face of the piston means which forms said compressing chamber with said cylinder means being on said partitioning means and being opposed by an opposing face of said partitioning means and said faces of the partitioning means forming in said compressor cylinder said compressing chamber and a balance chamber with said compressor cylinder so that said compressing chamber is outward and said balance chamber is more proximate to said combustion chamber and said balance and compressing chambers have respective ends of said compressor cylinder for walls, and pressure relief means communicates with said balance chamber for low average pressure to be maintained in said balance chamber on return stroke of said piston means.

8. A two-stroke-cycle, free-piston internal combustion engine compressor of claim 1, wherein said piston means more particularly includes cylinder partitioning means within a compressor cylinder of said cylinder means, said face of the piston means which forms said compressing chamber with said cylinder means being on said partitioning means and being opposed by an opposing face of said partitioning means and said faces of the partitioning means forming in said compressor cylinder said compressing chamber and a balance chamber with said compressor cylinder so that said compressing chamber is outward and said balance chamber is more proximate to said combustion chamber and said balance and compressing chambers have respective ends of said compressor cylinder for walls, and a pressure relief passage leads from said balance chamber and is in communication with said compressing chamber and has a one-way valve for opening said balance chamber to said compressing chamber on return stroke of said piston means, for low average pressure to prevail in said balance chamber on return stroke of said piston means.

9. A two-stroke-cycle, free-piston internal combustion engine compressor of claim 1, wherein said movable load responsive means includes a pneumatic fluid motor having an expansible chamber communicating with said compressing chamber for responding to load encountered by said piston means through said pressure-responsive gaseous fluid egress and anti-backflow means.

10. A two-stroke-cycle free-piston internal combustion engine compressor of claim 1, wherein said synchronously movable means includes a synchronously rotatable first member synchronously operatively interconnected with said piston means, and said movable load responsive means includes a second rotatable member and a pneumatic fluid motor drivingly connected with the latter said member, said motor having an expansible chamber communicating with said compressing chamber for responding to load, and said rotatable first and second members being rotatively interconnected and having passages communicating with each other and with said bounce chamber for opening said bounce chamber and movable out of communication for said members to close said bounce chamber.

11. A two-stroke-cycle, free-piston internal combustion engine compressor comprising cylinder means, engine compressor free-piston means reciprocatively within said cylinder means and having faces respectively forming with said cylinder means a combustion chamber, a pneumatic bounce chamber having a vent, and a gaseous fluid compressing chamber; fuel input means in output communication with said combustion chamber and having substantially the same quantity output of fuel to said combustion chamber for each cycle of a series of cycles of the engine operation for said free-piston means to operate on substantially constant combustion power input for power stroke throughout said series of cycles of the engine, said free-piston means introducing on each power stroke an increase in volume of the combustion chamber and decrease in volumes of said pneumatic bounce chamber and compressing chamber respectively, and on each return stroke a decrease in volume of the combustion chamber and increase in volumes of said pneumatic bounce chamber and compressing chamber respectively; pressure-responsive gaseous fluid ingress and anti-backflow means in communication with said compressing chamber for fluid to enter said compressing chamber in response to return stroke of said free-piston means; pressure-responsive gaseous fluid egress and anti-backflow means in communication with said compressing chamber for fluid to be discharged from said compressing chamber in response to next power stroke of said free-piston means and whereupon said piston means on the power stroke transmits energy to storage in fluid in said pneumatic bounce chamber for exertion to the next return stroke of said free-piston means; and bounce control means for the engine to maintain substantially constant inner dead position of said piston means from cycle to cycle of said series of cycles of the engine while length of stroke of said piston means varies upon variation in load being encountered by said piston means through said pressure responsive gaseous fluid egress and anti-backflow means, said bounce control means including valve means operatively communicating with said bounce chamber vent for said vent to be opened to a source of fluid having reference pressure and closed, said valve means comprising a synchronously movable first valve member communicating with the source of fluid having reference pressure and synchronously operatively interconnected with said piston means for moving in synchronism with said piston means in each cycle of said series of cycles of the engine through position for said vent to be opened to the source of pneumatic fluid having reference pressure and to position for said vent and pneumatic fluid at said reference pressure in said bounce chamber to be closed off for said piston means thereafter to work against said fluid in said bounce chamber in power stroke, and said valve means further comprising a movable load responsive second valve member communicating with said compressing chamber, for taking any of a series of positions relative to said synchronously movable first valve member in response to load encountered by said piston means through said pressure-responsive gaseous fluid egress and anti-backflow means, and communicating with said synchronously movable first valve member and said vent for closing said vent and pneumatic fluid at said reference pressure in said bounce chamber on movement of said synchronously movable first valve member to one of said positions of said synchronously movable valve member wherein said vent is to be closed consistent with varying the mass of pneumatic fluid in said bounce chamber inversely with load encountered by said piston means through said pressure-responsive egress and anti-backflow means, for said piston means thereafter to work in power stroke against said mass of fluid.

12. A two-stroke-cycle, free-piston internal combustion engine compressor comprising cylinder means, free-piston means including a pair of engine compressor free-piston units reciprocatively within said cylinder means and having opposed faces forming with said cylinder means a combustion chamber and each of said piston units having faces forming with said cylinder means a pneumatic bounce chamber having a vent and a gaseous fluid compressing chamber individually corresponding to the piston unit; synchronizing means interconnecting said piston units for their reciprocative movements to be equal and opposite; fuel input means in output communication with said combustion chamber and having substantially the same quantity output of fuel to said combustion chamber for each cycle of a series of cycles of the engine operation for said free-piston means to operate on substantially constant combustion power input for power stroke throughout said series of cycles of the engine, said free-piston units accordingly introducing on each power stroke an increase in volume of the combustion chamber and decrease in volumes of said pneumatic bounce chambers and compressing chambers respectively, and on each return stroke a decrease in volume of the combustion chamber and increase in volumes of said pneumatic bounce chambers and compressing chambers respectively; pressure-responsive gaseous fluid ingress and anti-backflow means in communication with said compressing chambers for fluid to enter said compressing chambers in response to return stroke of said free-piston means; pressure-responsive gaseous fluid egress and anti-backflow means in communication with said compressing chambers for fluid to be discharged from said compressing chambers in response to next power stroke of said free-piston means and whereupon said piston means on the power stroke transmits energy to storage in fluid in said pneumatic bounce chambers for exertion to the next return stroke of said free-piston means; and bounce control means for the engine to maintain substantially constant inner dead position of said piston means in said series of cycles of the engine while length of stroke of said piston means varies upon variation in load being encountered by said piston means through said pressure responsive gaseous fluid egress and anti-backflow means, said bounce control means including vent control means operatively communicating with said bounce chamber vents for said vents to be opened and closed, said vent control means comprising synchronously movable means synchronously operatively interconnected with said piston means, for moving in synchronism with said piston means in cycles of said series of cycles of the engine through positions wherein said vents are open and to positions for said vents and pneumatic fluid having reference pressure in said bounce chambers to be closed for said piston means thereafter to work against said fluid in said bounce chambers in power stroke, and said vent control means further comprising movable load responsive means communicating with said compressing chambers, for taking any of a series of positions relative to said synchronously movable means in response to load encountered by said piston means through said pressure-responsive gaseous fluid egress and anti-backflow means, and communicating with said synchronously movable means for said vents to be opened, and for closing said vents and pneumatic fluid at said reference pressure in said bounce chambers on movement of said synchronously movable means to one of said positions of said synchronously movable means wherein said vents are to be closed consistent with varying the mass of pneumatic fluid in said bounce chambers inversely with load encountered by said piston means through said pressure-responsive egress and anti-backflow means, for said piston means thereafter to work in power stroke against said mass of fluid.

13. A two-stroke-cycle free-piston internal combustion engine compressor of claim 12, wherein compressor cylinders of said cylinder means individually correspond to said piston units and said piston units have partitioning means in said compressor cylinders, said faces of the piston units which form said compressing chambers with said cylinder means being opposing faces of said partitioning means so that said faces of the partitioning means form in said compressor cylinders said compressing chambers and balance chambers with said compressor cylinders and so that said compressing chambers are outward and said balance chambers are more proximate to said combustion chamber and have ends of said compressor cylinders for walls, and pressure relief means communicates with said balance chambers for low average pressure to be maintained in said balance chambers on return stroke of said piston units.

14. A two-stroke-cycle free-piston internal combustion engine compressor of claim 12, wherein compressor cylinders of said cylinder means individually correspond to said piston units and said piston units have partitioning means in said compressor cylinders, said faces of the piston units which form said compressing chambers with said cylinder means being opposing faces of said partitioning means so that said faces of the partitioning means form in said compressor cylinders said compressing chambers and balance chambers with said compressor cylinders and so that said compressing chambers are outward and said balance chambers are more proximate to said combustion chamber and have ends of said compressor cylinders for walls, and pressure relief passages lead from said balance chambers and are in communication with one-way valve means for opening said balance chambers into discharge communication with said compressing chambers on return stroke of said piston units, for low average pressure to prevail in said balance chambers on return stroke of said piston units.

15. A two-stroke-cycle free-piston internal combustion engine compressor of claim 12, wherein said synchronizing means interconnecting said piston units for their reciprocative movements to be equal and opposite is operatively interconnected with said synchronously movable means for the latter said means to move in synchronism with said piston means.

References Cited in the file of this patent

UNITED STATES PATENTS

| 2,434,280 | Morain | Jan. 13, 1948 |
| 2,434,877 | Welsh et al. | Jan. 20, 1948 |
| 2,581,600 | Pescara | Jan. 8, 1952 |

FOREIGN PATENTS

| 611,767 | Great Britain | Nov. 3, 1948 |
| 879,094 | Great Britain | Oct. 4, 1961 |